US011434625B2

(12) United States Patent
Bailey et al.

(10) Patent No.: US 11,434,625 B2
(45) Date of Patent: Sep. 6, 2022

(54) FROZEN PIPE ALERT

(71) Applicant: HomeServe plc, Walsall (GB)

(72) Inventors: Samuel Bailey, London (GB); Greer Gray, Walsall (GB)

(73) Assignee: Leakbot Limited, Walsall (GB)

( * ) Notice: Subject to any disclaimer, the term of this patent is extended or adjusted under 35 U.S.C. 154(b) by 36 days.

(21) Appl. No.: 16/842,400

(22) Filed: Apr. 7, 2020

(65) Prior Publication Data

US 2020/0325660 A1    Oct. 15, 2020

(30) Foreign Application Priority Data

Apr. 9, 2019   (GB) ..................................... 1905033

(51) Int. Cl.
| | | |
|---|---|---|
| *E03B 7/07* | (2006.01) | |
| *E03B 7/04* | (2006.01) | |
| *E03B 7/10* | (2006.01) | |
| *G01K 1/02* | (2021.01) | |

(Continued)

(52) U.S. Cl.
CPC ................ *E03B 7/071* (2013.01); *E03B 7/04* (2013.01); *E03B 7/10* (2013.01); *G01K 1/026* (2013.01); *G08B 21/182* (2013.01); *G01K 1/143* (2013.01)

(58) Field of Classification Search
CPC .. E03B 7/04; E03B 7/071; E03B 7/10; G01K 1/026; G01K 1/143; G01K 3/005; G08B 21/182
See application file for complete search history.

(56) References Cited

U.S. PATENT DOCUMENTS

| | | |
|---|---|---|
| 2017/0138022 A1 | 5/2017 | Trescott et al. |
| 2017/0362801 A1 | 12/2017 | Van Goor et al. |

(Continued)

FOREIGN PATENT DOCUMENTS

| | | |
|---|---|---|
| GB | 2569470 A | 6/2019 |
| KR | 20140049759 A | 4/2014 |
| KR | 101871120 B1 | 7/2018 |

(Continued)

OTHER PUBLICATIONS

Gordon, Jeffrey R., "An Investigation into Freezing and Bursting Water Pipes in Residential Construction," Research Report 96-1, Building Research Council, U. of Ill. at Urbana-Champaign, Champaign, Ill., 1996; 52 pages, available at: https://www.ideals.illinois.edu/handle/2142/54757.

*Primary Examiner* — Quan Zhen Wang
*Assistant Examiner* — Rajsheed O Black-Childress
(74) *Attorney, Agent, or Firm* — Sterne, Kessler, Goldstein & Fox P.L.L.C.

(57) ABSTRACT

A method for determining whether water contained within a water pipe system in a building is at risk of freezing is disclosed. The method is carried out by a detector device comprising a processor. The method comprises determining a plurality of pipe temperature measurements using a temperature sensor. The processor analyses the pipe temperature measurements to detect whether a water draw has occurred. An exterior building environment temperature is compared to a predetermined freeze alert threshold. If the processor detects that (i) a water draw has not occurred; and (ii) the indicative temperature of the exterior building environment is lower than the predetermined freeze alert threshold, an alert is transmitted.

17 Claims, 9 Drawing Sheets

(51) Int. Cl.
*G08B 21/18* (2006.01)
*G01K 1/143* (2021.01)

(56) References Cited

U.S. PATENT DOCUMENTS

| | | | |
|---|---|---|---|
| 2018/0010978 A1* | 1/2018 | Bailey | G01K 1/143 |
| 2019/0136492 A1* | 5/2019 | Trescott | G01F 1/6847 |

FOREIGN PATENT DOCUMENTS

| | | |
|---|---|---|
| KR | 20190017204 A | 2/2019 |
| WO | WO 2015/183258 A1 | 12/2015 |

* cited by examiner

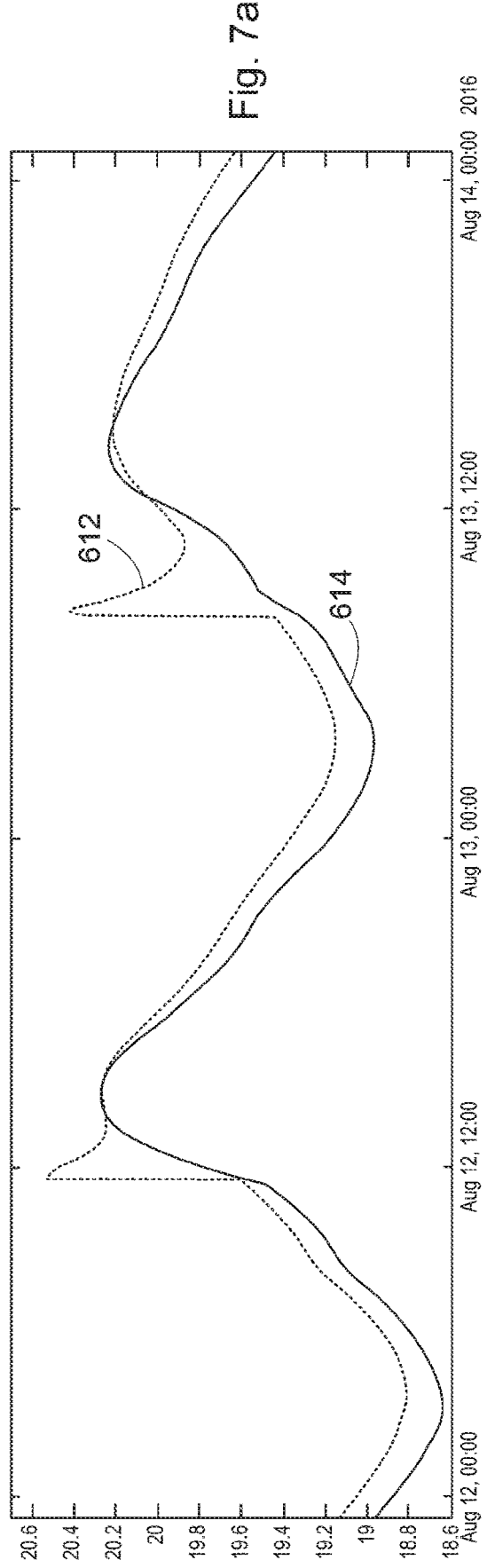
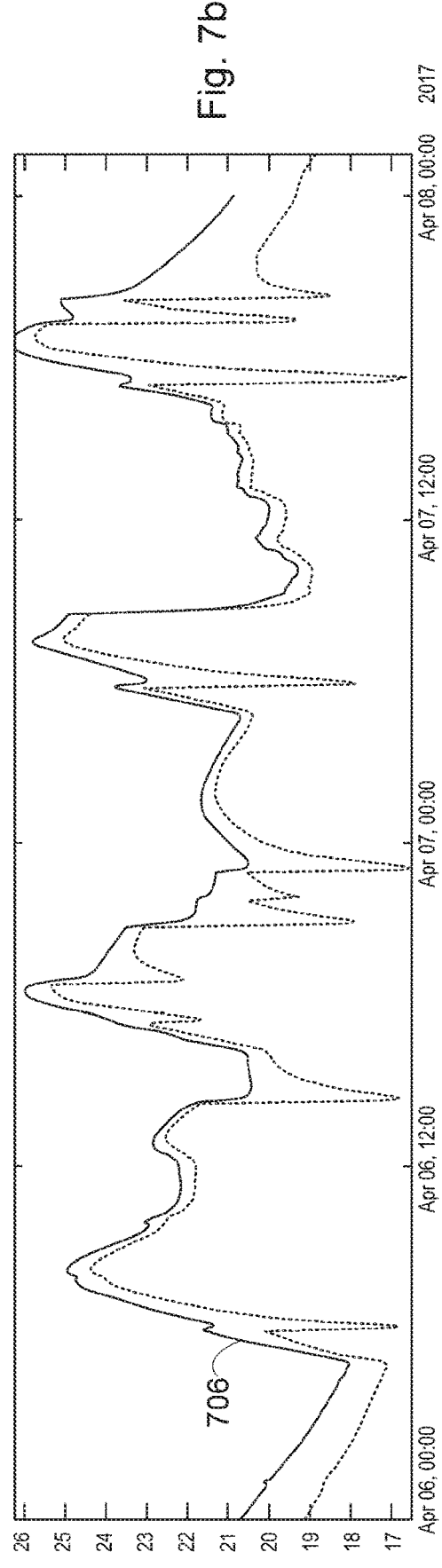

FROZEN PIPE ALERT

FIELD OF INVENTION

The present invention relates to methods and systems for detecting whether there is potential risk of frozen pipes within a house or building's water system.

BACKGROUND

Damage from burst residential water pipes because of freezing is widespread and costly. One US source (Voss Law Firm, PLC., 2014) reports: "Specifically, insurers have on average paid out $1.4 billion in broken pipe insurance claims per year for the last 19 years, for a grand total of $27.8 billion in the last two decades. Frozen pipes, ice damage, and other cold weather property damage made up seven percent of all insurance claims during this time period."

It is known that whether residential pipes are likely to freeze depends on a number of factors (Gordon, J. R. 1996) that may affect the pipes' temperature. These include:
  the temperature outside;
  the placement of the pipe in the building shell;
  the amount of insulation in that portion of the building, and the placement of the pipe in relation to the building insulation;
  wind speed, and whether there is a hole or crack in the building shell that would affect the pipe;
  the amount of insulation on the pipe itself, if any;
  the temperature on the inside of the building."

SUMMARY

The inventors have identified that there are various problems and difficulties associated with detecting the potential for a frozen pipe before it occurs. For example, even for a temperature sensor placed within a home, the placement relative to the pipes within a house or building may not be known. There may also be lack of information as to how well the house or building is insulated.

Furthermore, although a temperature sensor (for example, fitted to the home stopcock) may provide ambient temperature measurements (i.e. inside air temperature in the vicinity of the temperature sensor) these values may not correspond to the actual temperature near other pipes at risk of freezing. Such at-risk pipes may be in a cold basement, an uninsulated or unheated attic, or a crawl space, where no temperature sensor is present.

A basic approach would be to simply issue a blanket alert to all homes and buildings whose outside temperatures are forecast or currently measured to be low enough to present a freeze risk. However, the specificity of such a blanket alert will be low, and thus the accuracy of the alert in respect of which homes present a genuine freeze risk would be poor. Sending multiple alerts using the above basic criteria would send many unnecessary messages across a network, which would amount to an unnecessary wastage of network bandwidth.

Many homes will experience freezing temperatures and not have a pipe frozen or burst. The perceived value of such a blanket alert would therefore be low, and the alert would therefore tend to be ignored by homeowners or building landlords. Additionally, such a blanket alert may amount to 'spam', particularly during winter, and as such would also tend to be ignored.

According to one aspect of the invention, there is provided a method for determining whether water contained within a water pipe system in a building is at risk of freezing, wherein the method is carried out by a detector device comprising a processor. The method comprises: determining a plurality of pipe temperature measurements of a pipe of the water pipe system based on temperature data received from a first temperature sensor in thermal contact with the pipe, wherein the first temperature sensor is coupled to said processor. This step is generally performed in order to determine whether the building is unoccupied—advantageously, the method detector is able to determine this based on temperature data alone. analysing the plurality of pipe temperature measurements to detect whether a water draw has occurred in the water pipe system during a predetermined first period of time;

receiving an indicative temperature of an exterior building environment, and comparing said indicative temperature to a predetermined freeze alert threshold (where said indicative temperature may be a forecast temperature, measured contemporaneously, and be received locally or remotely); and if or when the processor detects that (i) a water draw has not occurred in the water pipe system during the predetermined first period of time; and (ii) the indicative temperature is lower than the predetermined freeze alert threshold, the processor is configured to;

transmit an alert to a remote device to indicate that water contained within the water pipe system is at risk of freezing.

The method may further comprise:

determining a plurality of ambient temperature measurements of an interior environment around said pipe of the water pipe system based on temperature data received from a second temperature sensor, wherein the second temperature sensor is coupled to said processor, and analysing the plurality of ambient temperature measurements to detect whether heating has been applied to the building during a predetermined second period of time, wherein the alert is transmitted to the remote device to indicate that water contained within the water pipe system is at risk of freezing if the processor further detects that heating has not been applied to the building during the predetermined second period of time. This step is generally done to determine whether the central heating is broken, or turned off unexpectedly. Advantageously, the method is able to differentiate between central heating and merely solar/environmental heating at this step. The first and second predetermined periods of time are likely to overlap in embodiments, in order to efficiently analyse blocks of data.

The method may further comprise transmitting the alert to the remote device to indicate that water contained within the water pipe system is at risk of freezing if the processor further detects that at least one of the plurality of ambient temperature measurements is lower than an interior low temperature alert threshold. Advantageously, by further taking account of the ambient (i.e. interior) building temperature, alerts with greater specificity are sent out, thus achieving a lower rate of 'false-positive' alerts. Moreover, sending fewer alerts but which are more accurate (i.e. alerts which are more likely to correctly indicate a freezing pipe) the amount of bandwidth used in a general network may be reduced.

The method may also comprise:

if the second temperature sensor is not within a heating envelope of the building, the interior low temperature alert threshold may be set to a first value which may be indicative of a freezing temperature, e.g. below the freezing point of water; and if the second temperature sensor is within the heating envelope of the building, the interior low temperature alert threshold may be set to a second value, wherein the second value may be greater than the first value and offset by a predetermined offset amount.

This offset amount may be implemented in order to account for the 'buffer' a heating/insulation envelope may provide to the exterior environment. As such, the second value may be set to be slightly above the freezing point of water.

The second sensor may automatically determine if it is within the heating envelope of the building. This automatic determining may comprise detecting that heating has been applied to the building, and that the indicative temperature of an exterior building environment is below an exterior low temperature threshold.

The predetermined offset amount may vary depending on the building and it surrounding climate/geographical area. For example, the offset value may be between 5 and 15 degrees Celsius. As mentioned, the first value of the interior low temperature alert threshold may be below the freezing point of water, and the second value of the interior low temperature alert threshold may be above the freezing point of water.

The analysing the plurality of pipe temperature measurements to detect whether a water draw has occurred may also comprise determining mathematical derivatives with respect to time of the plurality of pipe temperatures; and detecting that a water draw has not occurred if no derivative exceeds a predetermined pipe derivative threshold during the predetermined first period of time. It may be the case that if the at least one derivative exceeds the derivative threshold, a water draw is deemed to have occurred.

This set of mathematical derivatives may be determined from the full plurality of the available pipe temperatures, or may be calculated from a subset of the available data. For example, the second derivatives may only comprise the data from alternating values of the pipe temperature data.

The mathematical derivatives may be second order derivative with respect to time. The method may further comprise smoothing a plurality of the mathematical derivatives prior to the comparing to the predetermined derivative threshold.

The analysing the plurality of ambient temperature measurements to detect whether heating has been applied to the building may also comprise determining mathematical derivatives with respect to time of the plurality of ambient temperature measurements; determining a maximum derivative value; and detecting that heating has been applied to the building if the maximum derivative value exceeds a predetermined ambient derivative threshold during the predetermined second period of time.

The derivatives (in respect of ambient temperature) may be first order with respect to time: i.e. the rate of change of ambient temperature with respect to time (the gradient). Thus, the algorithm may determine that the maximum gradient value exceeds the predetermined ambient derivative threshold. As such, the processor may send a signal, or set an internal flag, that the central heating has indeed been applied.

The method may further comprise determining a minimum derivative value during a heating window of said predetermined second period of time; and detecting that heating has been applied to the building if the minimum derivative value is greater than zero during the heating window.

In other words, in preferable embodiments, it may be required in order to detect central heating that the temperature monotonically increases over the 'heating window'. It should be understood that the 'heating window' is simply the subset of time within the predetermined second period of time in which the heating event actually occurs. Mathematically, this method of determining heating during a 'heating window' may comprise; determining a minimum value for the gradient (first derivatives) of ambient temperature, and thus detecting that heating has been applied to the building if the minimum derivative value is greater than zero during the heating window. Advantageously, this allows the method to distinguish solar heating (which may contain ebbs and flows in respect of the temperature changes observed) from central heating which is likely to cause an uninterrupted/monotonic increase in ambient temperature.

In the above embodiments, the temperature measured by either of the first or second temperature sensors may not be representative of the temperature in other locations of the water pipe system in the building (i.e. parts inside or outside the heating/insulation envelope). Accordingly, the first and second temperature sensors may be in different, or the same, locations in the building. Thus, advantageously, the method provides a level of inference (i.e. without direct measurement) as to the temperature or freeze-risk of pipes at other locations within a building—especially when the sensor is contained within the heating envelope (hence the possibility of applying an offset to the interior low temperature alert threshold).

In any of the above embodiments, the receiving the indicative temperature of the exterior building environment may comprises receiving a forecast temperature in respect of the exterior building environment from a weather service; and/or measuring a current exterior building environment temperature by a local exterior temperature sensor. In other words, an interface of the device may access the internet to obtain a weather forecast of the exterior building environment, or, may access a current meteorological measurement via the internet. Alternatively, the device may measure the exterior temperature using a local temperature sensor which is external to the building.

In general, the predetermined first and/or second periods of time may be tuneable or adjustable based on properties of the monitored piping temperature. As previously mentioned, the predetermined first and second time periods may overlap. Furthermore, the time periods may be the period of time which immediately precedes the point in time at which the alert is transmitted to the remote device.

According to another aspect of the invention, a detector device is provided for determining whether water contained within a water pipe system in a building is at risk of freezing, the detector device comprising a processor, the processor configured to: determine a plurality of pipe temperature measurements of a pipe of the water pipe system based on temperature data received from a first temperature sensor in thermal contact with the pipe, wherein the first temperature sensor is coupled to said processor;

analyse the plurality of pipe temperature measurements to detect whether a water draw has occurred in the water pipe system during a predetermined first period of time;

analyse the plurality of ambient temperature measurements to detect whether heating has been applied to the building during a predetermined second period of time;

receive an indicative temperature of an exterior building environment, and compare said indicative temperature to a predetermined freeze alert threshold;

wherein if the processor detects that (i) a water draw has not occurred in the water pipe system during the predetermined first period of time; and (ii) the external temperature is less than the predetermined freeze alert threshold, the processor is configured to transmit an alert to a remote device to indicate that water contained within the water pipe system is at risk of freezing.

According to yet another aspect of the invention there is provided a non-transitory computer readable medium containing instructions for determining whether water contained within a water pipe system in a building is at risk of freezing which, when executed by a processor comprised within a detector device, causes the processor to perform any of the methods described herein.

The instructions may be provided on a carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE PREFERRED EMBODIMENTS

The invention will now be described with reference to the accompanying drawings in which:

FIGS. 7a and 7b show, respectively, an example graph depicting a detection device exposed to central heating, and a graph showing the device no exposed to central heating within a building;

DETAILED DESCRIPTION

Embodiments of the invention will now be described in more detail with reference to the drawings in which like references refer to like features in the various figures.

By employing a method using multiple temperature criteria, taking accounts of multiple aspects of the interior and exterior building environment, the method and systems described in the present disclosure provide for an accurate method of determining whether the pipes within a building present a freeze risk. By taking account of multiple different criteria, the method of the present disclosure outputs an alert of high value and specificity, which is unlikely to be false positive.

Therefore, the present method ensures that freeze risk alerts are sent only at times when a genuine or serious risk is detected. Therefore, a user of the building or other recipient of an alert is not overwhelmed or 'spammed' by an unnecessary volume of freeze warnings. A network will typically have to transmit such alerts to a recipient. Advantageously, a higher degree of alert specificity is attained by the present method, such that the overall load in a network which inevitably transmits the alerts is reduced, and such a network may operate more efficiently.

Figure 1:
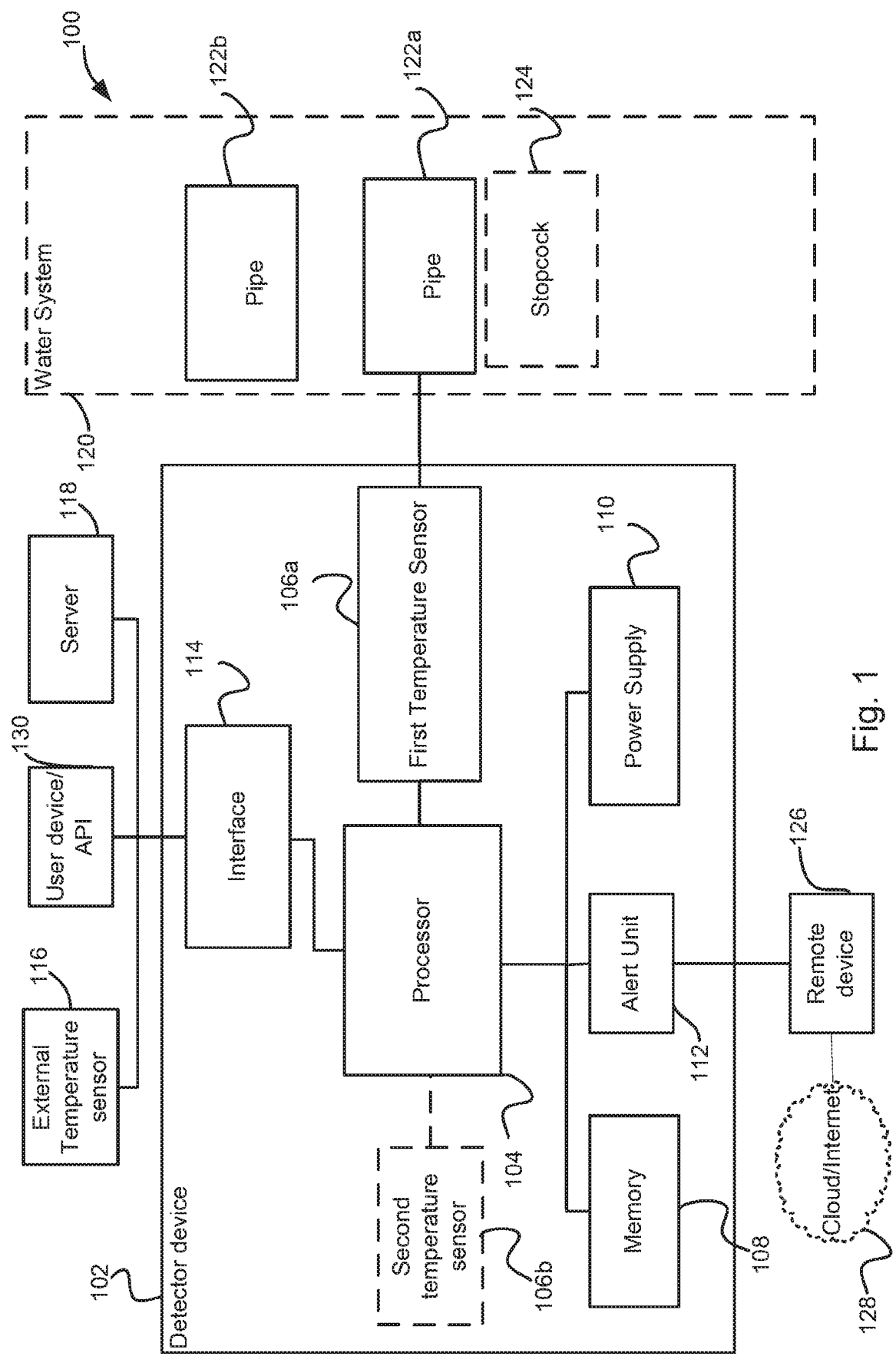
FIG. 1 shows an example implementation of a potential frozen pipe detection device/system.

FIG. 1 describes an example 100 freeze alert detection device 102, for monitoring the temperatures of a portion of piping of a water piping system, and an ambient temperature, within a building. The device comprises at least a first temperature sensor 106a, second temperature sensor 106b, at least one processor 104, memory 108 (e.g. to store received temperature data measured by the temperature sensors), and power supply unit. In some embodiments the temperature sensors (106a, 106b) and processor 104 may be comprised within a self-contained detector unit 102 which may then be placed in a single location within a building. Alternatively, the temperature sensors (106a, 106b) may be remotely coupled (e.g. by wireless signal, or physical cables) to the processor, and thus be places in separate locations within a building.

The device 102 is generally connected to a pipe 122a within the water piping system 120 of a building, where said building contains multiple lengths/channels of piping 122b. The water system may comprise a stopcock 124 which acts as a preliminary channel into the entire water supply of the building. In this way, all water available to the building must pass through the stopcock 124, which may have a valve to shut off the water supply. Advantageously, in some embodiments the detector device 102, or at least the first temperature sensor 106a, is coupled to the pipe 122a in the immediate vicinity of the stopcock 124. Therefore, the first temperature sensor 106a may be used to determine whether a water draw has occurred at any location inside the building, as all water entering the building will generally pass via the stopcock 124.

Generally, the pipe 122a, with which the first temperature sensor 106a is in thermal contact, will be made of a thermally conductive material such as metal, e.g. copper. In this way, the temperature of the pipe 122a detected by the first temperature sensor will be indicative of the temperature of the water within the pipe 112a. However, it will be readily understood by the skilled person that the detector device 102 is designed to raise an alert that any pipe (122a, 122b) within the plumbing water system 120 of a building is at risk of freezing, irrespective of the individual pipe 122a on which the first temperature sensor 106a is placed/has thermal contact.

The power supply 110 of the detector 102 may also be a self-contained power cell or battery, or may have an external connection to electricity mains within the building. Advantageously, a self-contained detector device 102 with a self-contained battery 110 enables the detector device to be placed on any portion or area of piping within a building, irrespective of nearby electricity outlets/sockets.

The detector device may also comprise an alert unit 112, capable of sending an alert to a remote location or device 126, or capable of creating an internal alarm within the building that a pipe is at risk of freezing. In an example embodiment, if the components of the detector device 102 determine that a pipe (122a, 122b) within the building is at risk of freezing, the processor 104 may instruct the alert unit 112, which may have wireless capabilities, to send an alert communication to a remote device/unit 126. This alert may be for the purpose of alerting a user of the building, e.g. a homeowner who not at home, that a pipe is about to freeze. The remote device 126 may be a remote server which can forward on the message to a relevant person, or a mobile device of a user of the building. Alternatively, the remote device 126 may be an internet router within the house capable of forwarding on the message further to the cloud 128 for further forwarding onto the relevant recipient of the alert.

The detector device 102 may further have an interface 114 with which it may obtain data on the external environment around the building. In embodiments of the detector, a temperature indicative of the exterior building environment is obtained and then compared to a predetermined freeze alert threshold, as part of the criteria for determining whether to send a freeze alert threshold. Thus indicative exterior temperature may be obtained, via the interface 114, from a remote server 118 which has access to weather forecast information, and/or current exterior temperature information. In this way, the indicative temperature may be a current meteorological temperature measurement or a forecast temperature at a point in the future. Additionally, via the interface 114 a user of the building, e.g. a homeowner, may be able to input certain details via a device or API 130 about the building which may be understood and stored by the detector device 102. For example, a user may use a mobile device 130 to input details of the geographical location of the building, or the location of the device within the building.

The exterior temperature may be a general temperature of the geographical area in the vicinity of the building (e.g. the surrounding town/city) as determined from weather forecast server 118. In other example embodiments, the indicative exterior building temperature may be the temperature in the immediate vicinity of the building, obtained from an external temperature sensor 116 local to the building, and directly coupled (wirelessly or otherwise) to the detector device 102.

Figure 2:
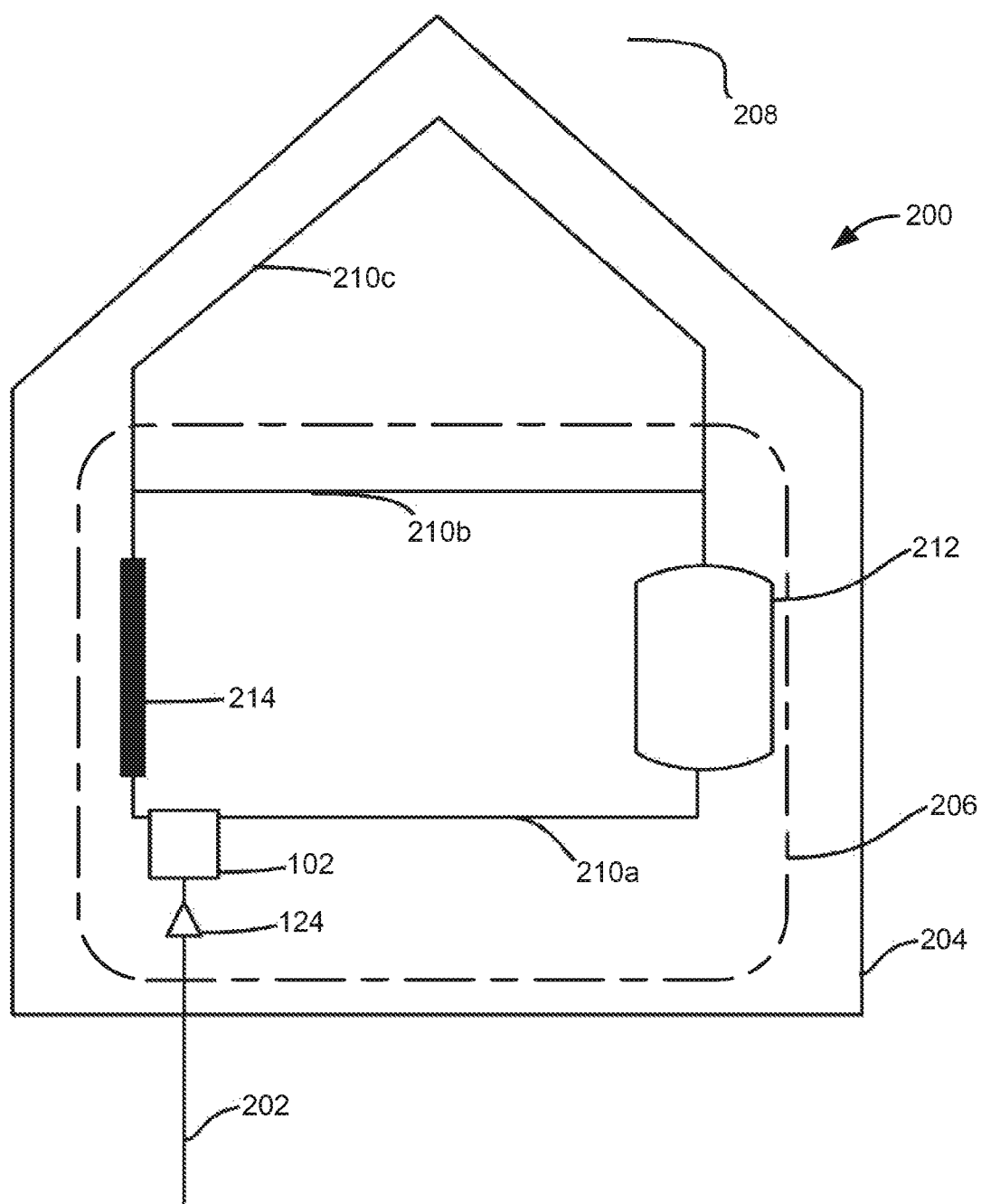
FIG. 2 shows an example skeleton layout of a house comprising the detector and water pipe system.

FIG. 2 shows an example structure 200 of a building 204 in which the detector device 102 may be located. The building comprises an inlet water supply pipe 202, i.e. from external water mains, a stopcock 124, detector device 102, at least one radiator 214 connected to the central heating system, a boiler (or other suitable heating provider for a building) 212 also connected to the central heating system, and lengths of piping (210a, 210b, 210c) which may serve both central heating and/or water appliances within the building. FIG. 2 further depicts an exterior area or environment 208 surrounding the building.

It will be readily understood by the skilled person that the detector device 102 may be placed in any suitable location within the building, so that it may be in thermal contact with a pipe 122a or any of pipes 210a, 210b, or 210c. The skilled person will further appreciate that embodiments of the device may comprise multiple second temperature sensors places on multiple different pipes throughout the building Also depicted in the building 204 is a heating envelope 206 of said building. This heating envelope may be, for example, all parts of the building which most strongly feel the effects of central heating, or are directly exposed to central heating. In example, embodiments, the heating envelope may be defined by portions of the house surrounded by thermal insulation. Moreover, it will be appreciated that a building may have several separate heating envelopes 206, and at least one location in the house which is not part of a heating envelope.

Therefore, in embodiments, it is assumed that locations within the building within the heating envelope will generally be a certain amount warmer than the immediate exterior of the building.

Areas inside the building but outside of the heating envelope, for example loft/attic pipes 210c, may be assumed to have temperatures more indicative of the immediate building exterior. Therefore, it is generally desirable for the detector device 102 to be able to autonomously detect whether it is inside or outside of the heating envelope 206, and to be able to set an interior low temperature alert threshold accordingly. Embodiments of methods to determine these thresholds are described in detail in the remainder of the specification.

Detection Method

Figure 3:
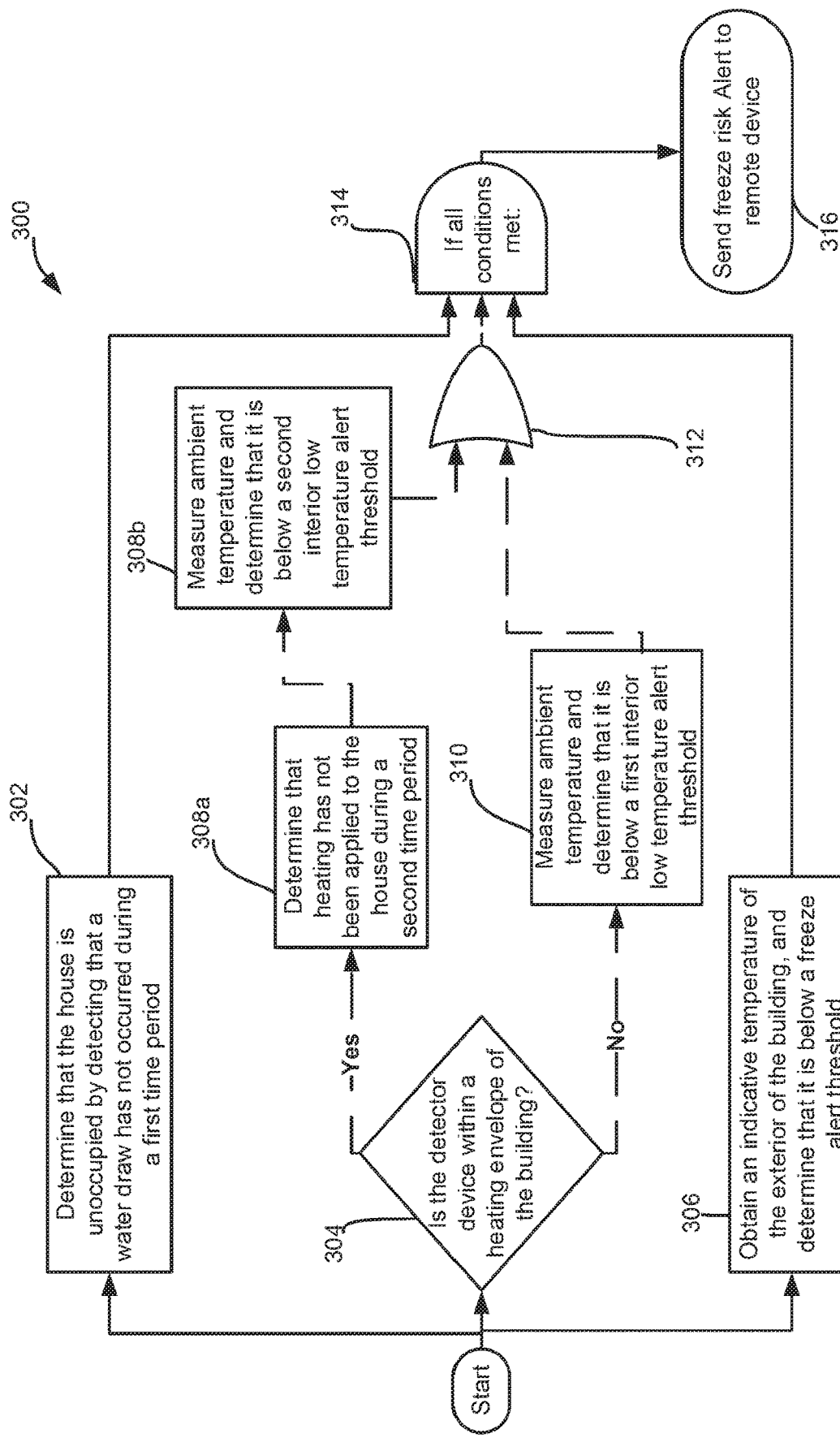
FIG. 3 shows a flowchart with an example implementation of the method steps in providing a frozen pipe alert.

FIG. 3 describes an example method 300 performed by processor 104 for operating the detector device 102 in order to determine whether or not to send a freeze alert threshold. The method is depicted as a set of logical steps, in which the order they are performed is not critical to the outcome.

It should be appreciated that, in the following description and FIG. 3, the order of the steps is not critical to the operation of the device, and the steps may be performed in a different order than that shown in FIG. 3, and generally any order conceivable from the layout of the method in FIG. 3.

It should also be understood that the dashed lines in FIG. 3 represents steps which are optional to the method in some embodiments. Thus, these steps need not be performed in conjunction with the others in order to achieve the advantageous technical effects associated with the method described herein. In other words, the method described herein is still able to sends free-alerts with a high level of specificity when only steps 302 and 306 are carried out as illustrated in FIG. 3. As such, in embodiments, it may be more suitable in certain buildings to additionally perform steps 304 and 308, or 310.

Furthermore, it will be readily appreciated that additional method step may be employed in some embodiments, or that a step in flow diagram 300 may be omitted in some embodiments.

Various different temperature thresholds, related to various temperatures, are used in the processes (including method 300) of determining whether to send a frozen pipe risk alert in the present disclosure. For the sake of clarity, those different temperature thresholds are itemised and briefly described below:

Freeze alert threshold. This is used by embodiments of the method to compare to an 'indicative temperature of an exterior building environment' such as a weather forecast temperature, or current outdoor temperature. The freeze alert threshold in some embodiments may be set around −4° Celsius.

First interior low temperature alert threshold. This first threshold is used when the detector device (or in specific embodiments, the second temperature sensor) is outside the heating envelope of a building. It is used to compare to an ambient temperature measurement inside the building. The first interior low temperature alert threshold in some embodiments may be set at around 6° Celsius.

Second interior low temperature alert threshold. This second threshold is used when the detector device (or in specific embodiments, the second temperature sensor) is inside the heating envelope of a building. It is used to compare to an ambient temperature measurement inside the building. The second interior low temperature alert threshold in some embodiments may be set at around −4° Celsius.

Exterior low temperature alert threshold. In some embodiments, this threshold may be used to determine whether or not the detector device (or in specific embodiments, the second temperature sensor) is inside the heating envelope of the house. That is, if the current measured exterior temperature is below this threshold, but the presence of heating in the building in detected, the detector device may be deemed to be in the heating envelope of the house.

Predetermined pipe derivative threshold. This may be used to compare against a maxima of the second derivatives of the plurality of pipe temperatures, in order to determine whether a water draw has occurred.

Predetermined ambient derivative threshold. This threshold may be used to compare to a maximum value of ambient temperature gradient values (i.e. the maximum first derivative value) in order to determine if, for example, central heating has been applied to a house. For example, the threshold may be set at such a value so as to only capture sharp rises in temperature indicative of central heating. Using such a high threshold helps to avoid flagging gradual rises in ambient temperature which may be indicative of solar heating.

Minimum gradient threshold. This threshold may be set to zero, and may be used to compare to the gradients (i.e. the first derivatives) of the plurality of ambient temperature values during a heating window in which it is detected that heating has been applied. This may be used in order to confirm that central heating has been applied, as opposed to solar heating, for example. Ensuring that a plurality of ambient temperature gradients are above zero during a 'heating window' is equivalent to determining that a corresponding plurality of ambient temperature measurements monotonically increase during said 'heating window'.

The method 300 is based on at least the following two assumptions about the risk of a pipe freezing in a building:
  if a property/building is occupied and heated, then its pipes are unlikely to freeze;
  if a property/building is unoccupied, but the heating has been left on (e.g. in a frost protection mode or cycle) then its pipes are unlikely to freeze.

The above assumptions are made on the basis that pipes within the heating and insulation envelope (e.g. 210a, 210b) of the building are subject to regular warming from the central heating, and thus will not be at risk of freezing. For pipes outside of the insulation envelope, it may be assumed that they will be unlikely to freeze when the heating is left on, for example in an appropriate frost prevention cycle. In other words, it may be assumed that exterior building temperatures have been low enough in the past for pipes to freeze, such that home owners or building proprietors will have taken measures to prevent more exposed pipes from freezing. For example, exposed or at-risk pipes (pipes which are outside a heating envelope) may be insulated such that they are unlikely to freeze when heating is on somewhere in the house. As such, a method step is in place to determine 310 whether the heating has been applied to the house.

Thus, in a general embodiment, the method 300 depicted in FIG. 3 is used to determine whether to alert people to a freeze risk under the following circumstances:
  The outside temperature is going to be low
  The property is unoccupied
  and optionally, that:

The heating has not been applied to the building—i.e. the heating is (unexpectedly) off (where this heating failure is unexpected, and may have either has been left off or failed)

In general, three embodiments of the device are possible which comprise: whether the device (in an embodiment where the device and temperature sensors are self-contained) is inside heating envelope of the building; outside the heating envelope of the building; or, ignoring the ambient temperature of the building and determining to send an alert based only on water-draws and external temperature. These methods are outlined generally below. Purely for the sake of example, is may be assumed that an offset of 10° C. may be used (i.e. the offset between the first and second interior low temperature alert threshold of steps 308b and 310) to account for an expectation of higher temperature inside the heating/insulation envelope than outside of it. A fourth algorithmic option may also be implemented, such that a freeze alert is sent, irrespective of other criteria, if the inside ambient temperature decreased below the freeze alert threshold (i.e., the threshold normally used to compare to an indicative outdoor/exterior building temperature).

Device is inside the heating envelope—assume ambient air temperature around device is around 10° C. warmer than air temperature of pipes at risk outside heating envelope:
  i) if it has been a number of hours since heating has been observed then we can say that the device is inside the heating envelope and the heating is not on and has not been applied (but it should be on, and/or should have been applied); and
  ii) if it has been a number of hours since we last saw any water draws then we can say that the property is empty; and
  iii) if the forecast outside temperature OR the current outdoor temperature (in other words, an indicative exterior environment temperature) is lower than the freeze alert threshold; and
  iv) if the ambient air temperature is lower than an inside envelope building unoccupied threshold (e.g. −4° C.+10° C.=6° C.):
then there is a risk of water in a pipe freezing in an unoccupied property, and therefore a freeze alert should be sent.

Device is outside the heating envelope—assume ambient air temperature around device is representative of pipes at risk outside heating envelope:
  i) if it has been a number of hours since we last saw any water draws then we can say that the property is empty; and
  ii) if the forecast outside temperature OR the current outdoor temperature (in other words, an indicative exterior environment temperature) is lower than the freeze alert threshold; and
  iii) if the ambient air temperature is lower than an outside envelope building unoccupied threshold (−4° C.);
then there is a risk of water in a pipe freezing in an unoccupied property, and therefore a freeze alert should be sent.

Device may be anywhere inside the building, and ambient temperature is not accounted for in the method—pipes at risk of freezing:
  i) if it has been a number of hours since we last saw any water draws then we can say that the property is empty; and
  ii) if the forecast outside temperature OR the current outdoor temperature (in other words, an indicative exterior environment temperature) is lower than the freeze alert threshold;

then there is a risk of water in a pipe freezing in an unoccupied property, and therefore a freeze alert should be sent.

Device may be anywhere inside the building:
i) if either or both of the first or second temperature sensors measure a temperature below the freeze alert threshold (which, for the sake of example may be around −4° C.);

then there is a risk of water in a pipe freezing in the property, whether it is unoccupied or occupied, and therefore a freeze alert should be sent.

The details of the above methods are now described in more detail, with possible variations on the above described embodiments.

The Outside Temperature is Going to be Low

At step 306 of the method 300, the detector device 102 assesses weather the building exterior is likely to drop below a freeze alert threshold. As previously described, the detector device's 102 location can be input to an API 130 to determine forecast outdoor temperatures, e.g. to be used as indicative exterior building environment temperatures. If the forecast temperature, or actual current outdoor temperature, falls below a freeze alert temperature threshold (for example, −6° C., −4° C., or which may be adjusted accordingly) in the next 24 hours, then the device may flag at method step 306 that the building's exterior environment (e.g. outside temperature) is going to be low enough to present a freeze risk. It will be understood that any suitable future period of time may be used, for example, between 6 hours and 72 hours, or more in some embodiments.

The Property is Unoccupied

At step 302, the detector device determines whether the building is unoccupied. To determine whether the property is empty or not, we can detect the presence of water draws, and then calculate how many hours have elapsed since we last saw any. If the number of hours is greater than a tuneable threshold then we can say that the property is empty. Water draws may be detected by thresholding the smoothed second derivative of the pipe temperature.

Detector Device Inside the Heating Envelope

If step 304 is effected during in embodiments of operation of the detection device, the detector device determines whether or not it is within a heating envelope 206 of the building. As previously mentioned, in some embodiments, the second temperature sensor (used to monitor ambient temperatures) may be remotely coupled to the detector device and thus in a separate location to the detector device 102. In such an embodiment, the processor 104 of the detector device 102 determines whether or not the second temperature sensor 106a is within the heating envelope. For example, the detector device may determine, at step 304, whether it within a heating envelope by detecting whether central heating is ever applied. In such an example, the device would detect that it is not within a heating envelope if it has never detected central heating (i.e., non-solar heating) applied to the building. Conversely, in one embodiment detecting a sharp increase in ambient temperature, indicative of central heating, may be used to flag that the device is indeed within a heating envelope.

Generally, depending on whether the detector device is within the heating envelope or not, two different routes (308 or 310) will be taken to determine whether the indoor ambient temperature is sufficiently low to consider sending a freeze alert.

In some embodiments of step 304, the device may be able to autonomously detect whether or not it is within a heating/insulation envelope of the building after being installed. For example, the device may continuously, or periodically, monitor the ambient temperature to detect central heating after being installed. For example, the device may monitor for typical or indicative signs of central heating being applied, for example, a sharp rise in temperature. Other suitable embodiments which measure the rate of change of ambient temperature could also be applied to step 304. Alternatively, the detection device may monitor the absolute temperature to determine whether the temperature is indicative of, e.g., a living or attic environment. In an example, if the measured ambient temperature never exceeds 15° C. it may be assumed that the device is outside the heating envelope.

As yet another example, the detection device may be provided with a user interface, by which the user may be able to enter whether the detection device is contained within a living area (i.e. within the heating envelope) or within an attic space (i.e. outside the heating envelope). In this way, the detection device does not have to incur cost to its power supply in determining whether or not it is within a heating envelope of a building.

The detector is inside the heating envelope, and heating has not been applied to the building.

If, in an embodiment, step 308a is effected during operation of the detection device, the detector device determines whether heating has been applied to the building during a predetermined time period. An example embodiment would relate to the central heating in a home. In embodiments, if heating has not been applied for a period of hours, the device may infer that the heating has either been left off, or has unexpectedly failed. In one embodiment, the central heating in a home produces a characteristic profile for the change in ambient air temperature surrounding the detector device. Such an ambient temperature profile is distinct from e.g. solar heating. Advantageously, the detection device is able to distinguish between central and solar heating due to this distinction (as further set out in FIG. 5).

The central heating causes a sharp rise in ambient temperature that should be detectable as heating being applied. For example, the detector device may monitor for a noticeable increase in temperature over a predetermined period of time, as well as requiring that the temperature does not decrease over a heating window within said period of time.

The detector device generally is designed to monitor whether the heating is off unexpectedly. Thus, in an alternative embodiment, the detector device may be directed to detect whether a known/planned central heating cycle (such a frost prevention cycle) is not detected as anticipated (as opposed to monitoring for a sharp rise in ambient temperature during a predetermined time period). In this way, it may be detected that the central heating is broken or unexpectedly turned off.

At step 308b, the detector device 102 assess whether the ambient room temperature is low enough (e.g. below an interior low temperature alert threshold) to consider sending a freeze alert. The detector 102 makes this assessment given the knowledge that it is within a heating envelope of the building 204. Therefore, the interior low temperature alert threshold, in some embodiments, may be set to a value which is above the freezing point of water. For example, the interior low temperature alert threshold at step 308b may be calculated as the freeze alert threshold (say −4° C.) plus 10° C.: −4° C.+10° C.=6° C.

In this way, the method 300 accounts for the fact that, inside the heating envelope 206, the ambient temperature may not be indicative of the colder temperatures outside the heating envelope. Thus, an offset (which in one embodiment may be around 10° C.) is applied to the freeze alert threshold to obtain an interior low temperature alert threshold. Advantageously, by accounting for the temperature discrepancy between areas inside and outside the heating envelope, the detector device may provide an alert that a pipe somewhere in the building is at risk of freezing, irrespective of the placement of the detector device. It will be appreciated that, depending on the building or the general climate of the area surrounding the building, a variety of thresholds may be selected, e.g. around 5-15° C.

The detector is outside the heating envelope.

When it is determined, at step 304 (if this step is effected during operation of the device in embodiments), that the detector device 102 is not within the heating envelope of the building, the instructions of method 300 cause the processor 104 take the route via 310. At step 310 the device determines whether the ambient temperature (i.e. as measured by the second temperature sensor 106b) of the building is below an interior low temperature alert threshold. If the device detects that the ambient temperature is lower that the interior low temperature alert threshold than this stream of the method progresses—if not, then no alert will be sent.

In embodiments, this interior alert threshold may be close, or equal to, the general freeze alert temperature threshold (i.e. around −4° C.). In alternative embodiments, the interior low temperature alert threshold may be adjusted to be slightly higher depending, for example, on the level of insulation inside the building.

The logic step 312 (representative of on 'OR' gate) is used to indicate that either (or both) of streams 308a or 310 being determined positively will result in the continuation of the method. In other words, only one of the criteria outlined by 308a and 310 must be met. It will be understood by the skilled person that, in some embodiments, more than one temperature sensor used to monitor ambient temperature may be comprised within detector device 102. In this case, and if only one of two ambient temperature sensors is comprised within the heating envelope 206 of the house, it is possible that both routes 308a and 310 will be determines by the detector device.

The logic step 314 (representative of an 'AND' gate) is used to indicate that all three criteria described in steps 302, 304, and 306 must be met in order to the freeze risk alert to be sent.

It should be appreciated that, regarding method 300, all separate method streams 302 and 306 must be satisfied (as step 314 describes: all conditions met) in order to a freeze alert to be sent. Furthermore, in the embodiments where the device further attempts to detect central heating by measuring a plurality of ambient temperatures, all separate method streams (i.e. 302, 304, and 306) and the steps therein must be satisfied.

For example, if at step 306 it is detected that the indicative exterior temperature is still above (i.e. warmer than) the freeze alert threshold, then no alert will be sent irrespective of the outcome other criteria. The processor of the detector device may then, in embodiments, start the algorithm 300 over again at a suitable point in the future. For example, the detector device may have instructions comprised in its memory 108 executable on processor 104 to perform the method 300 periodically: for example, every 30 minutes or hour.

In a further example embodiment, an 'override' function may be applied to method 300 to send an alert even if the house is occupied. Thus, in this embodiment, irrespective of the outcome of any individual step or comparison to a threshold, if an (interior) ambient temperature is measured to be below the freeze alert threshold (e.g. −4° C.) then an alert is actioned as in step 316. This override bears the advantage that, even if the house is deemed to be occupied and the heating deemed to be working, a home owner or property proprietor will still be alerted to the potential of a frozen pipe. Such an eventually might arise, for example, if piping in an uninsulated attic is exposed to the exterior environment during a particularly cold spell, even where the central heating is working and on.

Finally, the method 300 as illustrated may be carried out in a preferable order, for example, to conserve energy in almost efficient way by prioritising carrying out the most power-efficient steps first. Thus, in an embodiment, the steps may be carried in the order: 302 (i.e. check for water usage), 304 (i.e. check for central heating being applied) and 306 (i.e. check the outdoor/building exterior temperature via an API). Nevertheless, many other advantageous permutations will be readily apparent to the person skilled in the art.

Figure 4:
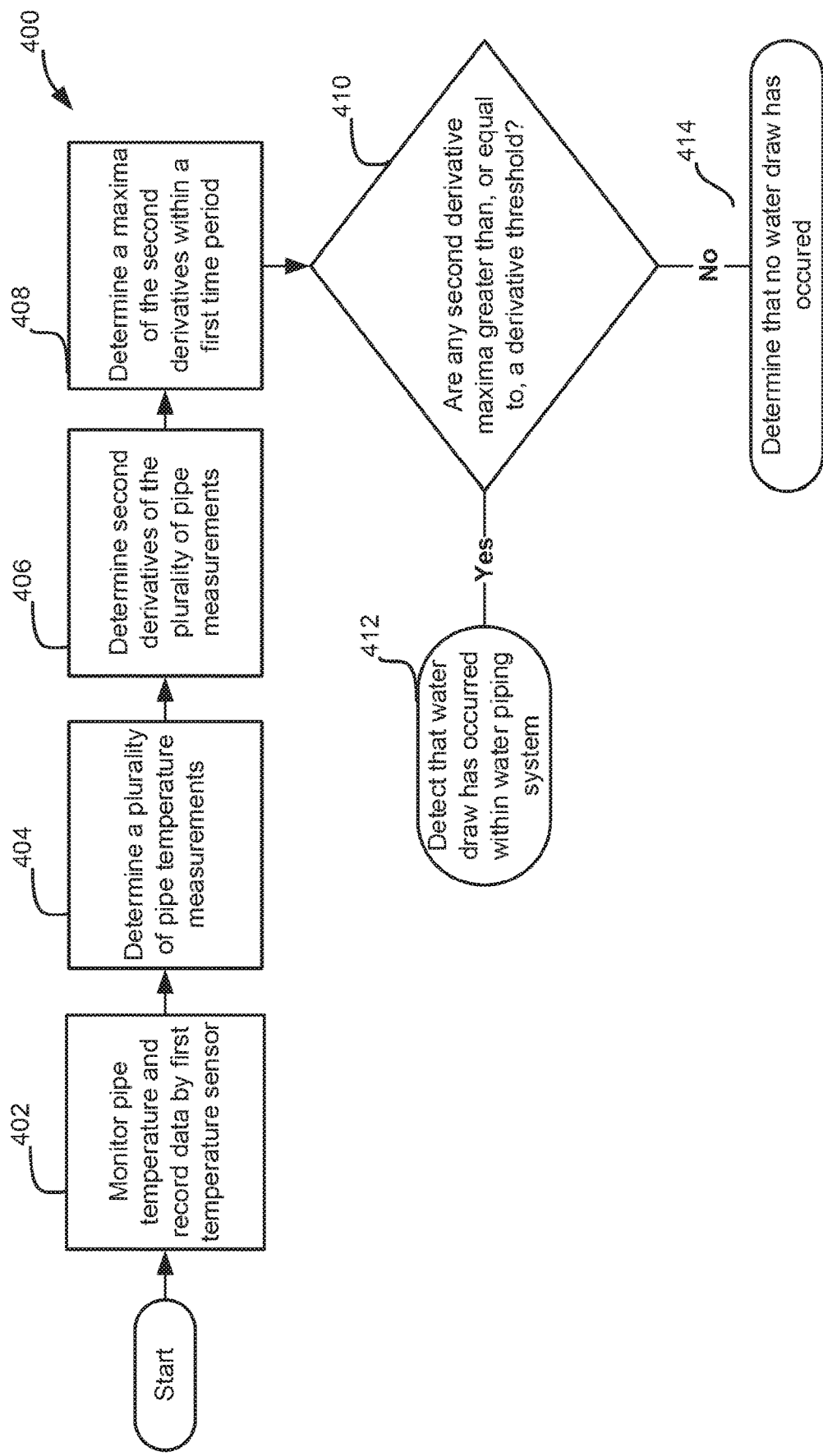
FIG. 4 shows a flowchart with an example implementation of the method steps in determining whether a water draw has occurred in a water pipe system.

FIG. 4 shows an example method used by the processor of the detector device to determine whether or not a water draw has occurred in the house. The determination of a water draw is used as a measure/criterion to detect whether the house is unoccupied. That is, in an embodiment of carrying out method 300, if it has been a number of hours since any water draws have been observed then it may be assumed that the building/property is empty.

At step 402 the first temperature sensor 106a monitors the temperature of the pipe 122a to which it is in thermal contact. The data collected from this monitoring is sent to the detection device (or stored in the memory 108 thereof) and may be stored in the memory 108 of the device 102. Alternatively, it will be appreciated that the temperature data may be stored remotely, e.g. in a cloud 128 or server 118 communicatively coupled to the detector device 102.

At step 404 a plurality of pipe temperature measurements are determined for analysis.

The processor 104 of the device 102 may perform this analysis. The plurality of measurements may be chosen, for example, to span a predetermined period of time during which the device will detect whether a water draw has occurred. Merely for example, the processor may have instructions stored within its memory to analyse the immediately preceding 12-24 hours of pipe temperature data. It will be appreciated that any suitable period of time may be applied here. The processor may analyse such a period of time periodically (or even continuously in some embodiments) to detect if the house/building becomes unoccupied.

The house will be deemed empty by the detector after a period of time has elapsed, within which no water draw has occurred. This time period may be determined in a variety of ways which will no doubt occur to the skilled person. For example, the time period could be either: a generic value based on the maximum time a property is expected to be empty (e.g., 9 hours from 8 a.m. to 5 p.m.), plus some margin of error; or a value based on the distribution of previous vacancy periods. For example, if 98% of no-water-draw periods have all been less than 12 hours, the time period may be set to 12 hours.

At step 406, the second derivatives of the plurality of temperature measurements are calculated/determined. The second derivatives are the derivatives with respect to time. Any suitable method for determining a second derivative may be used, for example, a numerical approximation. therefore, it should be appreciated that the absolute value of pipe temperature is not important, since only the second derivatives need to be calculated which require only relative variations in pipe temperature to be known.

For example, let '$T_p$' denote values of pipe temperature, and 't' denote time. The plurality of values of $T_p(t)$ will be used to calculate $$T_p''(t) = \frac{d^2 T_p}{dt^2}.$$

At step 408, any maxima of the values of $T_p''(t)$ may be determined. The term maxima is used to express mathematical maxima, i.e., a turning point in the values of $T_p''(t)$ Optionally, in some embodiments, the values of second derivatives may be 'smoothed' in order to diminish any undesirable noise in the temperature data. In some embodiments, it may not be necessary to determine any such maxima—all values of second derivatives may be compared to a threshold at step 410.

At step 410, the values of the maxima may be compared to a derivative threshold. Thus, if any maxima (or any second derivate value at all) equals or exceeds the threshold, a water draw is deemed to have been detected at step 412. If no maxima or other value of the set of second derivatives $T_p''(t)$ exceeds the threshold then a water draw will not be detected according to outcome 414. It may further be detected, according to the outcome of 414, that the house is unoccupied if no water draw is detected during a certain predetermined period of time. This period of time may vary between approximately 6 and 24 hours, by way of example.

In order to maximise the detection of a water draw, as previously mentioned, it may be advantageous to place/couple the detection device (or at least the first temperature sensor) with the pipe adjacent to the stopcock of the house. This may help ensure that all water draws in any part of the building are detected.

Figure 5:
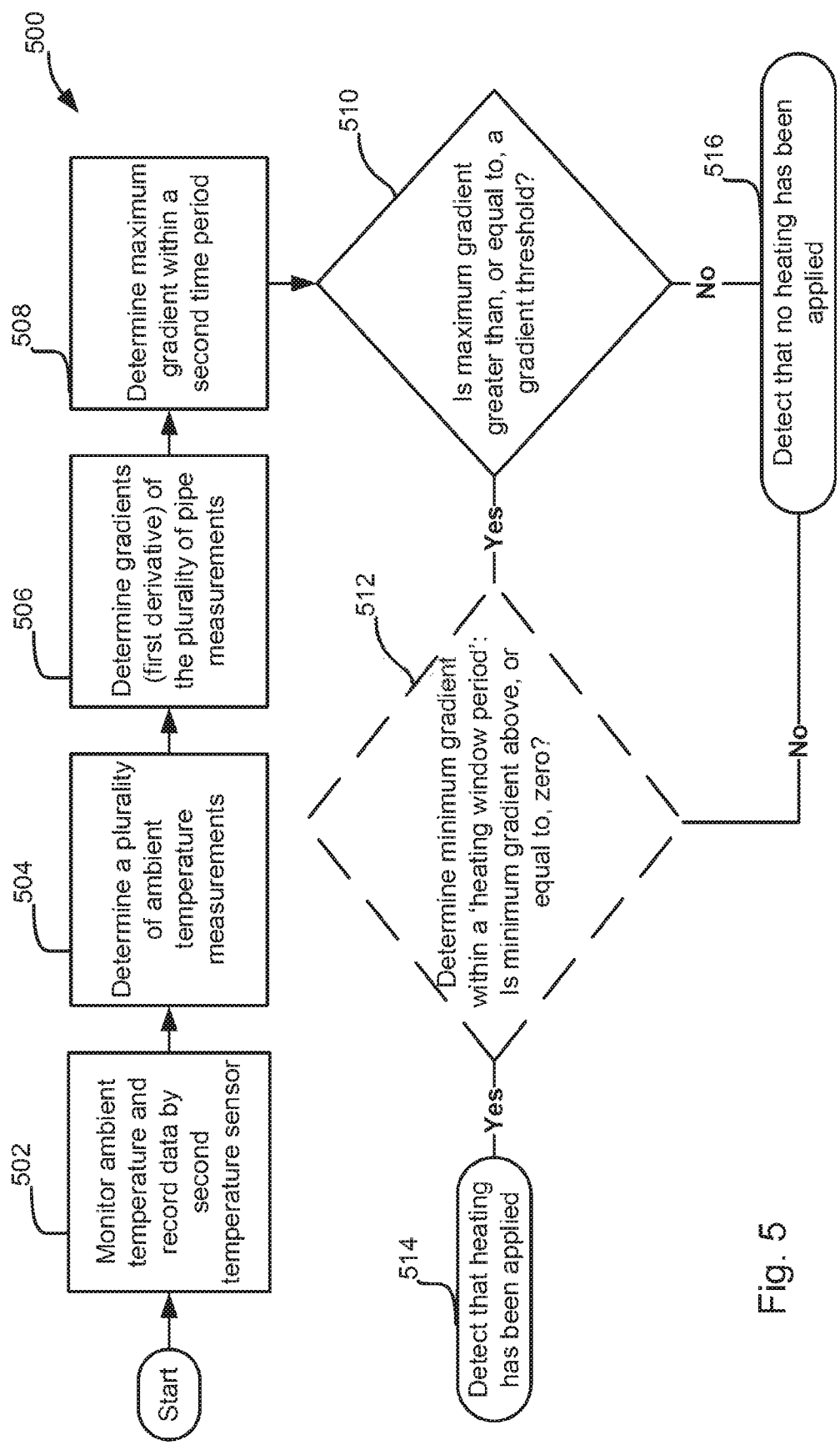
FIG. 5 shows a flowchart with an example implementation of the method steps involved in determining whether heating has been applied to the building.

FIG. 5 shows an example method 500 used by the processor of the detector device to determine whether or not heating has been applied to the building. The steps used are designed to be able to distinguish between an actual heating event such as central heating in a home, and other heating events such as solar heating.

In embodiment of carrying out method 300, if it has been a number of hours since heating has been detected, it may be assumed both the detector device is within a heating envelope 206 of the building, but that the heating is not is on (but it should be). It may be detected, therefore, that the heating has been unexpectedly left off, or has broken.

At step 502 the second temperature sensor 106b monitors the ambient temperature of the building. This ambient temperature may be the air temperature in the vicinity of the detector device in which the temperature sensor is incorporated. Alternatively, the ambient temperature may be the air temperature in a room in which the temperature sensor 106b (being remotely and/or communicatively coupled to the processor 104) is placed. The data collected from this monitoring is sent to the detection device 102 and may be stored in the memory 108 of the device 102. Alternatively, it will be appreciated that the temperature data may be stored remotely, e.g. in a cloud 128 or server 118 communicatively coupled to the detector device 102. This may also apply to the pipe temperature data.

At step 504 a plurality of pipe temperature measurements are determined for analysis. The processor 104 of the device 102 may perform this analysis. The plurality of measurements may be chosen, for example, to span a predetermined period of time during which the device will detect whether heating has been applied. Merely for example, the processor may have instructions stored within its memory to analyse the immediately preceding 6 hours of ambient temperature data. It will be appreciated that any suitable period of time may be applied here. The processor may analyse such a period of time periodically to detect if the building's heating has unexpectedly stopped working/been turned off.

At step 506, the first derivatives (i.e. the gradients) of the plurality of temperature measurements are calculated/determined. The derivatives are with respect to time. Any suitable method for determining the gradient/derivative may be used, for example, a numerical approximation.

For example, let $T_A$ denote values of pipe temperature, t and denote time. The plurality of values of $T_A(t)$ will be used to calculate $$T_A'(t) = \frac{dT_A}{dt}.$$

At step 508, the maximum value of the values of $T_A'(t)$ may be determined. This will correspond to the steepest gradient in the ambient temperature data, or, the sharpest rise in heating of the building.

At step 510, the value of the maximum gradient is compared to a gradient threshold. Thus, if the maximum values equals or exceeds the threshold, it may be assumed that heating has been applied. If the maximum gradient does not exceed the threshold then a heating is not detected according to outcome 516.

It may further be detected, according to the outcome of 516, that the heating in the house is broken if no heating is detected during a certain predetermined period of time, but it is known that the second temperature sensor (or detecting device) is in fact within a heating envelope of the house. This period of time may vary between approximately 6 and 24 hours, by way of example.

In order to maximise the positive detection of central heating, as opposed to merely solar heating, a further step may be carried out at step 512. This further step includes analysing whether the heating occurring during a heating window (as is detected in 510) is continuous, and that the temperature does not dip/decrease at any point. In other words, step 512 analyses to check that the temperature does not decrease at any point in the 'heating window'. Mathematically, this corresponds to confirming that the minimum gradient value during a heating window is still positive i.e. greater than zero. In yet more detail, this mathematically corresponds to a monotonically increasing series of ambient temperature values during a heating window.

It will be understood that a 'heating window' refers to a subset of the predetermined period of time for which the plurality of ambient temperatures are analysed. For example, the heating window may correspond to the actual period in which heating is occurring (i.e. a positive gradient is continuously detected in the ambient temperature data).

If the criteria at either step 510 or 512 are not met, then the detector device determines that no heating has been applied to the house.

Figure 6:
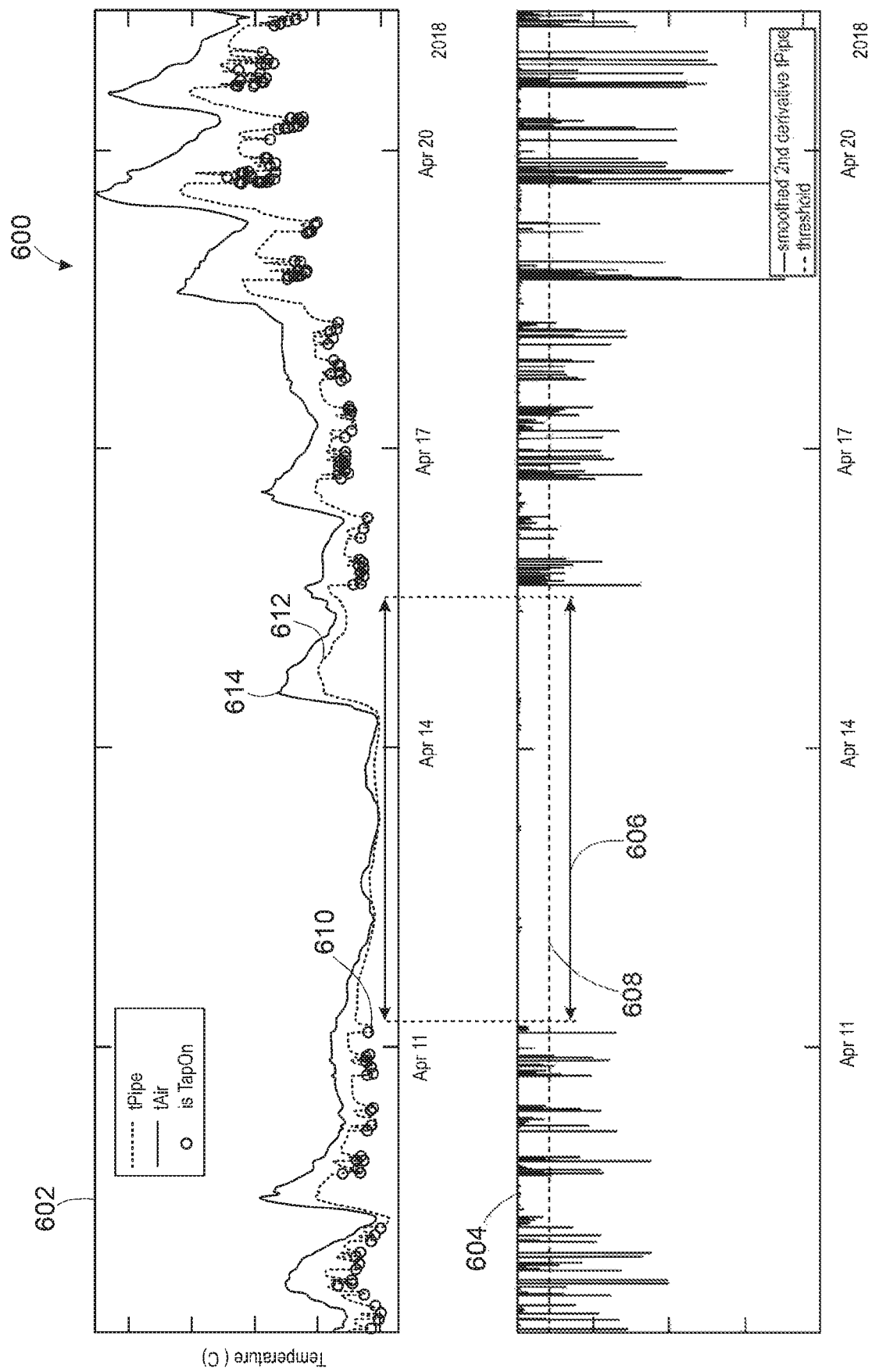
FIG. 6 shows an example temperature graph with a subplot of a plurality of pipe and ambient air temperatures, and a further subplot showing the derivatives of the pipe temperatures.

FIG. 6 shows an example temperature graph with a subplot 602 of a plurality of pipe and ambient air temperatures, and a further subplot 604 showing the derivatives of the pipe temperatures. The upper graph 614 in subplot 602 depicts an example of a series of ambient temperature measurement data, and the lower line 612 depicts a series of pipe 122a temperature measurement data. The marked circles 610 on the pipe temperature data series 612 depict points at which the detection device has detected a water draw.

Subplot 604 shows the calculated (smoothed) second derivative data of the pipe temperature data 612. It can be seen that the water draws 610 marked in subplot 602 correspond to various maxima on the data in subplot 604 which exceed the dashed derivative threshold 608 also marked on 608.

The region 606 corresponding to both subplots, and denoted by parallel arrows, shows an example of a period in which a building is deemed to be unoccupied, since no water draws are observed during this time period. In other words, during time period 606, it can be seen that none of the values or maxima of the series of second derivatives in 604 exceeds the marked threshold 608.

It can further be appreciated in this graph 600 that the absolute temperature of the pipe is not important or even necessary for determining whether a water draw has occurred—only the rate of change of temperature in the pipes is important for detecting a water draw. Advantageously, the described method which employs second derivatives is suitable for, and effective at, detecting water draws irrespective of the exterior weather or general environmental temperature. That is, only the relative change in pipe temperatures are required, not the absolute temperatures.

FIGS. 7*a* and 7*b* show, respectively, an example graph depicting a detection device exposed to central heating, and a graph showing the device no exposed to central heating within a building. In this particular example, the upper graph of FIG. 7*a* shows the temperature data from a detection device not exposed to central heating (i.e. outside the heating envelope of the building), and FIG. 7*b* shows the data from a detection device where the heating is set on twice daily. The upper line 612 represents pipe temperature data, and the lower line 614 represents ambient air temperature data.

FIG. 7*a* shows a marginal increase in both ambient and pipe temperature. In the example depicted in FIG. 7*a*, the overall variation of temperature is only about 2° C. This small variation on temperature may indicate, in an embodiment of the method, that the detector device is not placed within a heating envelope of the house.

FIG. 7*b* shows data indicative of a device placed within the heating envelope, where a regular heating pattern/cycle is in place. Not only is the overall variation in ambient temperature much greater (roughly 7° C.), but a regular and periodic heating pattern may be detected by the detection device. As such it will be appreciated that, in some embodiments, the detection device may detect that the regular heating pattern is not being followed, and thus determine that the heating is not on as it should be, e.g. it is broken.

Figure 8:
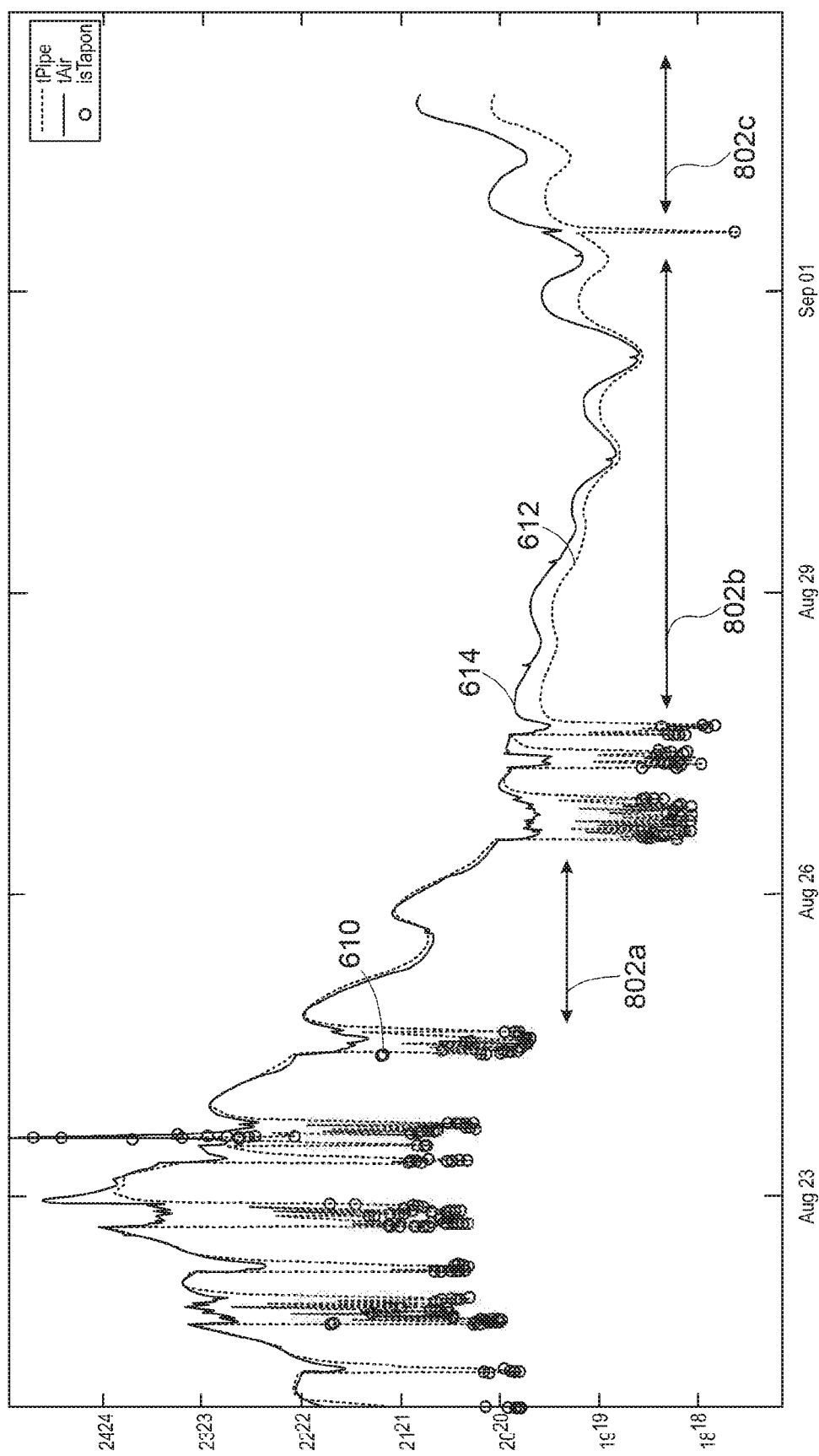
FIG. 8 shows an example temperature graph, showing pipe and ambient temperatures, with regions indicative of an unoccupied building.

FIG. 8 shows an example temperature graph, showing pipe and ambient temperatures, with regions (802*a*, 802*b*, and 802*c*) indicative of an unoccupied building. As with FIG. 6, circles 610 marked on the pipe temperature data 612 (corresponding to rapid changes in the rate of change of pipe temperature) are used to indicate where a water draw has been detected. The ambient temperature data is represented by data series 614. The regions (802*a*, 802*b*, and 802*c*) corresponding to periods where the building is deemed to be unoccupied are determined according to method 400. In some embodiments, these regions (802*a*, 802*b*, and 802*c*) correspond to periods of time greater than a predetermined period of time in which no water draw is detected. By way of example, such a predetermined period of time may be between 6 and 24 hours.

Figure 9:
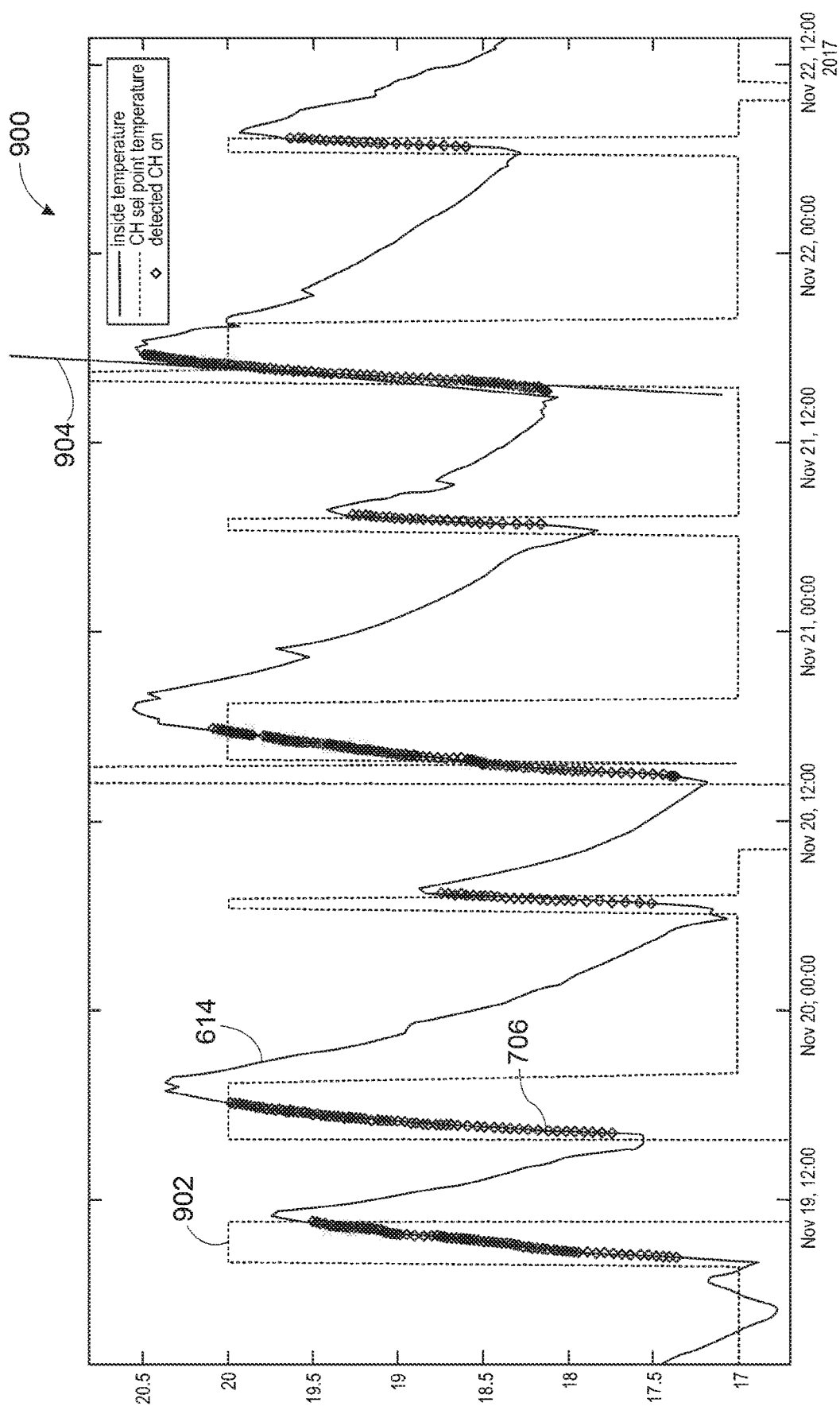
FIG. 9 shows an example ambient temperature graph showing sharp rises in ambient temperature indicative of central heating.

FIG. 9 shows an example ambient temperature graph showing sharp rises in ambient temperature indicative of central heating. In detail, the graph shows an example series of ambient temperature data 614 as measured by the ambient temperature sensor 106*b*, comprising regions where the heating has been applied (denoted as a step function) 902, moments 706 at which the heating has been detected by the detection device (denoted on the graph 900 and circles on the data), and an example of a maximum gradient of the ambient temperature data 904, for example as determined at step 508 by method 500.

While the present disclosure has been particularly shown and described with reference to preferred embodiments, it will be understood to those skilled in the art that various changes in form and detail may be made without departing from the scope of the present disclosure as defined by the appendant claims.

The invention claimed is:

1. A method for determining whether water contained within a water pipe system in a building is at risk of freezing, wherein the method is carried out by a detector device comprising a processor, the method comprising:

determining a plurality of pipe temperature measurements of a pipe of the water pipe system based on temperature data received from a first temperature sensor in thermal contact with the pipe, wherein the first temperature sensor is coupled to said processor;

analysing the plurality of pipe temperature measurements to detect whether a water draw has occurred in the water pipe system during a predetermined first period of time;

receiving an indicative temperature of an exterior building environment, and comparing said indicative temperature to a predetermined freeze alert threshold;

wherein if the processor detects that (i) a water draw has not occurred in the water pipe system during the predetermined first period of time; and (ii) the indicative temperature of the exterior building environment is lower than the predetermined freeze alert threshold, the method further comprising:

transmitting an alert to a remote device to indicate that water contained within the water pipe system is at risk of freezing;

determining a plurality of ambient temperature measurements of an interior environment around said pipe of the water pipe system based on temperature data received from a second temperature sensor, wherein the second temperature sensor is coupled to said processor;

analysing the plurality of ambient temperature measurements to detect whether heating has been applied to the building during a predetermined second period of time;

wherein the alert is transmitted to the remote device to indicate that water contained within the water pipe system is at risk of freezing if the processor further detects that heating has not been applied to the building during the predetermined second period of time;

wherein the alert is transmitted to the remote device to indicate that water contained within the water pipe system is at risk of freezing if the processor further detects that at least one of the plurality of ambient temperature measurements is lower than an interior low temperature alert threshold;

if the second temperature sensor is not within a heating envelope of the building, setting the interior low temperature alert threshold to a first value; and if the second temperature sensor is within the heating envelope of the building, setting the interior low temperature alert threshold to a second value, wherein the second value is greater than the first value and offset by a predetermined offset amount.

2. The method of claim 1, wherein the second temperature sensor automatically determines if it is within the heating envelope of the building, the automatic determining comprising:

detecting that heating has been applied to the building, and that the indicative temperature of the exterior building environment is below an exterior low temperature threshold.

3. The method of claim 1, wherein the predetermined offset amount is a value between 5 and 15 degrees Celsius.

4. The method of claim 1, wherein the first value of the interior low temperature alert threshold is below a freezing point of water, and the second value of the interior low temperature alert threshold is above the freezing point of water.

5. The method of claim 1, wherein the analysing the plurality of pipe temperature measurements to detect whether a water draw has occurred comprises:

determining mathematical derivatives with respect to time of the plurality of pipe temperature measurements; and detecting that the water draw has not occurred if no derivative exceeds a predetermined pipe derivative threshold during the predetermined first period of time, optionally wherein the mathematical derivatives are second order derivatives with respect to time.

6. The method of claim 5, further comprising smoothing a plurality of the mathematical derivatives prior to the comparing to the predetermined pipe derivative threshold.

7. The method claim 1, wherein the analysing the plurality of ambient temperature measurements to detect whether heating has been applied to the building comprises:

determining further mathematical derivatives with respect to time of the plurality of ambient temperature measurements;

determining a maximum derivative value; and detecting that heating has been applied to the building if the maximum derivative value exceeds a predetermined ambient derivative threshold during the predetermined second period of time, optionally wherein the further mathematical derivatives are first order derivatives.

8. The method of claim 7, further comprising:

determining a minimum derivative value during a heating window of said predetermined second period of time; and detecting that heating has been applied to the building if the minimum derivative value is greater than zero during the heating window.

9. The method of claim 1, wherein the temperature measured by either of the first or second temperature sensors is not representative of the temperature in other locations of the water pipe system in the building.

10. The method of claim 1, wherein the first and second temperature sensors are in a single location in the building.

11. The method of claim 1, wherein the first and second temperature sensors are in different locations in the building.

12. The method of claim 1, wherein the receiving the indicative temperature of the exterior building environment comprises:

receiving a forecast temperature in respect of the exterior building environment from a weather service; and/or measuring a current exterior building environment temperature by a local exterior temperature sensor.

13. The method of claim 1, wherein the predetermined first period of time is adjustable based on properties of the monitored piping temperature.

14. The method claim 1, wherein the predetermined second period of time is adjustable based on properties of the monitored ambient temperature.

15. The method of claim 1, wherein the predetermined first and second time periods overlap, and immediately precede a point in time at which the alert is transmitted to the remote device.

16. A detector device for determining whether water contained within a water pipe system in a building is at risk of freezing, the detector device comprising a processor, the processor configured to:

determine a plurality of pipe temperature measurements of a pipe of the water pipe system based on temperature data received from a first temperature sensor in thermal contact with the pipe, wherein the first temperature sensor is coupled to said processor;

analyse the plurality of pipe temperature measurements to detect whether a water draw has occurred in the water pipe system during a predetermined first period of time;

receive an indicative temperature of an exterior building environment, and compare said indicative temperature to a predetermined freeze alert threshold;

wherein if the processor detects that (i) a water draw has not occurred in the water pipe system during the predetermined first period of time; and (ii) the indicative temperature of the exterior building environment is less than the predetermined freeze alert threshold, the processor is configured to:

transmit an alert to a remote device to indicate that water contained within the water pipe system is at risk of freezing; and the processor is further configured to:

determine a plurality of ambient temperature measurements of an interior environment around said pipe of the water pipe system based on temperature data received from a second temperature sensor, wherein the second temperature sensor is coupled to said processor;

analyze the plurality of ambient temperature measurements to detect whether heating has been applied to the building during a predetermined second period of time;

wherein the alert is transmitted to the remote device to indicate that water contained within the water pipe system is at risk of freezing if the processor further detects that heating has not been applied to the building during the predetermined second period of time:

wherein the alert is transmitted to the remote device to indicate that water contained within the water pipe system is at risk of freezing if the processor further detects that at least one of the plurality of ambient temperature measurements is lower than an interior low temperature alert threshold; and the processor is configured to:

if the second temperature sensor is not within a heating envelope of the building, set the interior low temperature alert threshold to a first value; and if the second temperature sensor is within the heating envelope of the building, set the interior low temperature alert threshold to a second value, wherein the second value is greater than the first value and offset by a predetermined offset amount.

17. A non-transitory computer readable medium containing instructions for determining whether water contained within a water pipe system in a building is at risk of freezing which, when executed by a processor comprised within a detector device, causes the processor to:

determine a plurality of pipe temperature measurements of a pipe of the water pipe system based on temperature data received from a first temperature sensor in thermal contact with the pipe, wherein the first temperature sensor is coupled to said processor;

analyse the plurality of pipe temperature measurements to detect whether a water draw has occurred in the water pipe system during a predetermined first period of time;

compare a received indicative temperature of an exterior building environment to a predetermined freeze alert threshold;

wherein if the processor detects that (i) a water draw has not occurred in the water pipe system during the predetermined first period of time; and (ii) the external temperature is less than the predetermined freeze alert threshold, the processor is configured to:

transmit an alert to a remote device to indicate that water contained within the water pipe system is at risk of freezing; and the processor is configured to:

determine a plurality of ambient temperature measurements of an interior environment around said pipe of the water pipe system based on temperature data received from a second temperature sensor, wherein the second temperature sensor is coupled to said processor;

analyze the plurality of ambient temperature measurements to detect whether heating has been applied to the building during a predetermined second period of time;

wherein the alert is transmitted to the remote device to indicate that water contained within the water pipe system is at risk of freezing if the processor further detects that heating has not been applied to the building during the predetermined second period of time;

wherein the alert is transmitted to the remote device to indicate that water contained within the water pipe system is at risk of freezing if the processor further detects that at least one of the plurality of ambient temperature measurements is lower than an interior low temperature alert threshold; and the processor is configured to:

if the second temperature sensor is not within a heating envelope of the building, set the interior low temperature alert threshold to a first value; and if the second temperature sensor is within the heating envelope of the building, set the interior low temperature alert threshold to a second value, wherein the second value is greater than the first value and offset by a predetermined offset amount.

* * * * *